United States Patent
Janssen

(10) Patent No.: US 6,785,973 B1
(45) Date of Patent: Sep. 7, 2004

(54) MEASURING DEVICE COMPRISING A MOVABLE MEASURING PROBE

(75) Inventor: Antonius Johannes Janssen, Beerze 20, Someren 5711 KB (NL)

(73) Assignees: E. Knip & Co., Gemonde (NL); Antonius Johannes Janssen, Someren (NL)

(*) Notice: Subject to any disclaimer, the term of this patent is extended or adjusted under 35 U.S.C. 154(b) by 0 days.

(21) Appl. No.: 10/129,263
(22) PCT Filed: Nov. 2, 2000
(86) PCT No.: PCT/NL00/00796
§ 371 (c)(1), (2), (4) Date: Aug. 20, 2002
(87) PCT Pub. No.: WO01/33161
PCT Pub. Date: May 10, 2001

(30) Foreign Application Priority Data

Nov. 3, 1999 (NL) .............................. 1013479

(51) Int. Cl.⁷ ................................................ G01B 3/10
(52) U.S. Cl. .............................. 33/1 N; 33/756; 33/763
(58) Field of Search .......................... 33/756, 760, 761, 33/503, 504, 1 N, 1 PT, 534, 762, 763

(56) References Cited

U.S. PATENT DOCUMENTS

| | | | |
|---|---|---|---|
| 3,553,842 A | * | 1/1971 | Gerber et al. ................ 33/1 M |
| 3,564,533 A | * | 2/1971 | Linn ............................ 33/1 M |
| 3,758,949 A | * | 9/1973 | Fausel et al. ................. 33/1 M |
| 4,412,383 A | * | 11/1983 | Landa .......................... 33/1 M |
| 4,500,749 A | * | 2/1985 | Khoshnevis ................. 33/1 M |
| 4,578,867 A | * | 4/1986 | Czerwinski et al. .......... 33/761 |
| 4,703,443 A | * | 10/1987 | Moriyasu ...................... 33/1 N |
| 4,813,146 A | * | 3/1989 | Jaluzot ........................ 33/1 PT |
| 5,101,572 A | * | 4/1992 | Kwong et al. ................. 33/503 |
| 5,248,960 A | * | 9/1993 | Hamma ...................... 345/157 |
| 6,209,219 B1 | * | 4/2001 | Wakefield et al. ............. 33/761 |

FOREIGN PATENT DOCUMENTS

| | | |
|---|---|---|
| DE | 38 33 203 | 2/1990 |
| WO | 91 14150 | 9/1991 |
| WO | 95 19540 | 7/1995 |

* cited by examiner

Primary Examiner—Diego Gutierrez
Assistant Examiner—Madeline Gonzalez
(74) Attorney, Agent, or Firm—Oblon, Spivak, McClelland, Maier & Neustadt, P.C.

(57) ABSTRACT

A measuring device including a moveable measuring probe and sensors coupled to the measuring probe for providing position data of the measuring probe. The measuring probe is coupled, by a cord or a wire, to a first sensor for measuring a length or change in length of the cord or wire, and to a second sensor for measuring an angle or angular displacement of the cord or the wire. The obtained position data can be graphically represented and/or used for driving an automatic machining apparatus for producing a product corresponding to the measured data.

20 Claims, 9 Drawing Sheets

MEASURING DEVICE COMPRISING A MOVABLE MEASURING PROBE

BACKGROUND OF THE INVENTION (1) Field of the Invention

The invention relates to a measuring device comprising a movable measuring probe and sensors coupled to the measuring probe for providing position data of the measuring probe.

(2) Description of Related Art

A measuring device of this kind is known from U.S. patent application Ser. No. 4,703,443, and can be used for measuring the shape or contour of a two-dimensional or three-dimensional object, such as machine components or the like that are placed on a measuring table.

This prior art measuring device comprises an arm that is rotatably mounted on the measuring table, the length of which arm can be varied. The arm consists of a number of separate, pivotally interconnected elements. Disposed on the free end of the arm is a measuring probe, which is likewise pivotally connected thereto.

Angular displacement sensors, such as potentiometers, for measuring the angle between elements disposed adjacently to each other are present at all pivot points of the arm for the purpose of determining the effective length of the arm, that is, from the pivot point to the point where the measuring probe is in contact with the object to be measured. On the basis of the lengths of the individual elements, which are known per se, and the measured angle between said elements it is then possible to determine the effective length of the arm by means of a simple mathematical computation. Subsequently the two-dimensional or three-dimensional contour of an object to be measured can be determined from the length and the angular displacement of the arm by means of well-known mathematical formulas based on a Cartesian, spherical or cylindrical coordinate system.

The presence of a relatively large number of sensors at the pivot points of the arm for determining the length thereof makes the arm relatively vulnerable and liable to malfunction, in particular when potentiometers are used. Furthermore it will be apparent that the maximum length of the arm is inevitably limited for constructional reasons, so that this prior art device is only suitable for measuring relatively small objects, which can be placed on a measuring table.

Consequently it is an object of the invention to provide an improved measuring device, which has been designed for measuring small objects to be placed on a measuring table, as well as relatively large objects disposed in a room.

BRIEF SUMMARY OF THE INVENTION

According to the invention this object has been accomplished in that the measuring probe is coupled, via a cord or a wire, to a first sensor for measuring the length or change in length of the cord or the wire, and to a second sensor for measuring an angle or angular displacement of the cord or the wire.

Instead of using a pivotable arm the device according to the invention uses a cord or a wire, so that a single sensor will suffice for determining the length or change in length of the cord or the wire, and a measuring device that is much less liable to malfunction can be provided. By using a cord or a wire also the inherent limitation as regards the length of the prior art pivotable arm has been overcome, as a result of which it is also possible to measure relatively large objects that are disposed in a room. By way of illustration, in a practical embodiment of the measuring device according to the invention, measurement is carried out with a cord or wire having a length of 6 meters or more.

In an embodiment of the device according to the invention, in order to enable accurate determination of the angle or angular displacement of the cord caused by a change in position of the measuring probe, the second sensor is coupled to an elongate, rotatably supported arm, in the longitudinal direction of which the cord or the wire engages the arm.

In a preferred embodiment of the measuring device according to the invention, the arm is coupled to the second sensor at a first end, and is provided at a second free end with an opening precisely adapted to the thickness of the cord or the wire, through which opening the cord or the wire can be moved. The clearance between the wire and the opening must be minimal in order to keep the arm in line with the cord or the wire as accurately as possible.

In an embodiment of the measuring device according to the invention the arm is supported in such a manner that it is rotatable in an imaginary plane, in particular for measuring two-dimensional objects. On the basis of the measured angle or angular displacement of the arm and the measured length or change in length of the cord or the wire, the contour of an object scanned by means of the measuring probe can be accurately determined by means of mathematic computations based on a polar coordinate system.

Since the accuracy of such a measurement is determined, among other things, by the accurate rotation of the arm in said imaginary plane, the arm of another embodiment of the measuring device according to the invention is rotatably supported at a point some distance away from its first end, in such a manner that the first end of the arm extending beyond the point of support is suitably shaped for balancing the arm, or that said end can be provided with adjusting means for balancing the arm in said imaginary plane with the desired accuracy.

In yet another embodiment of the measuring device according to the invention the arm is spatially rotatably supported, for example by means of a ball joint mounted on the first end of the arm for swingably supporting the arm. An arm which is spatially rotatable or swingable in this manner is suitable for measuring contours of three-dimensional objects, for example based on the well-known spherical coordinate system.

The speed at which the measurement can be carried out depends, among other things, on the speed at which the arm is capable of following the changes in position of the cord or the wire.

In the preferred embodiment of the invention the arm is supported in a precision bearing having the smallest possible starting moment, that is, the moment that is required for causing the bearing to rotate from standstill.

In yet another embodiment of the invention the arm is made of a material having a low specific weight, such as aluminium or a plastic, wherein the arm is furthermore designed to comprise as little material as possible whilst retaining sufficient mechanical strength, however.

For an accurate measurement of the length or change in length of the cord or the wire caused by a change in position of the measuring probe, the cord or the wire needs to be sufficiently taut when the position of the probe is being determined.

According to an embodiment of the invention, again in order to enhance the speed of the measuring operation, the first sensor is coupled to a tensioning and roll-up mechanism for keeping the cord or wire tensioned under the influence of spring tension and for automatically rolling up said cord or wire. Thus it is achieved that the cord or the wire is sufficiently tensioned for carrying out the measurement at all times so as to be able to accurately determine the length or change in length of the cord or the wire.

In a preferred embodiment of the measuring device according to the invention the tensioning and roll-up mechanism comprises a rotatably supported reel, whose outer surface is provided with a spiral groove that has a depth adapted to the diameter of the cord or the wire, and movably supported guide wheels for guiding the cord or the wire in such a manner that it will follow said spiral groove of the reel.

This embodiment of the tensioning and roll-up mechanism prevents the cord or the wire from heaping up upon being wound onto the reel, which would introduce an error into the measurement. After all, the length of the cord or the wire is determined by the diameter of the reel, wherein the heaping up of layers of cord or the wire in fact corresponds to unknown changes in the diameter of the reel. Furthermore, the cord or the wire is prevented from being flattened upon being wound up as a result of several layers of cord or the wire being wound one on top of another. Said flattening of the cord or the wire in turn results in an unknown variation in the determination of the changes in length and consequently in an unknown measuring error.

In the preferred embodiment of the invention the measuring probe is elongate in shape, comprising a grip for taking hold of the measuring probe and a pin-shaped end that is rotatably supported with respect to said grip, to which said cord or the wire is attached.

By attaching the cord or the wire to the rotatably supported pin-shaped end it is achieved that the cord or the wire will extend in the radial direction of the measuring probe at all times during the positioning of the measuring probe. Consequently, no errors are introduced into the linear measurement, because the wire is not in line with the centre of the measuring probe and/or with the pin-shaped end thereof.

In particular for measuring relatively large objects, wherein the cord or the wire can have a length of 6 meters or more, a material which is as low-stretch as possible should be selected, because stretch of the cord makes the linear measurement unreliable. It has become apparent that paraleine cord or paraleine wire is sufficiently stretch-proof for the purpose of the invention. Of course also the spring tension of the tensioning and roll-up mechanism must be selected in such a manner that it will not cause undesirable stretch of the cord or the wire.

Sensors that are suitable for the purpose of the invention are known per se in practice. In a preferred embodiment of the invention the sensors are in the form of pulse generators, wherein the number of pulses delivered during use is proportional to a change in length or angular displacement of the cord or the wire or of the arm coupled thereto.

The sensors and the rotatable arm of the measuring device according to the invention can be accommodated in a compact, portable housing, from where the measuring probe and the cord or the wire can be displaced. The housing can be placed on a measuring table or at any other point in a room for measuring a respective object.

In yet another embodiment of the invention, in order to facilitate using the measuring device with existing computer apparatus, such as a desk computer or a portable computer (laptop), the measuring device is characterized by a processing device connected to the sensors for processing measuring signals delivered by the sensors into position data of the measuring probe and making said data available on an interface. The interface is preferably a standardized interface for use with computer peripherals, such as the RS 232, which is known per se, or the like.

In the most complete embodiment the measuring device comprises a further processing device connected to the interface, such as a desk computer or a portable computer, which is provided with suitable software for processing the position data for driving a device for graphically representing the obtained position data, and/or software for processing said position data for driving a machining apparatus for directly and automatically producing an object corresponding to the position data. Graphical devices or plotters and machining apparatus that are suitable for this purpose are known per se in the industry.

Consequently, the invention also provides apparatus for graphically representing measured position data, characterized by a measuring device as described above, which is connected to said processing apparatus.

The invention furthermore relates to machining apparatus for automatically producing objects on the basis of predetermined measuring data, characterized by a measuring device as described above, which is connected to said processing apparatus.

The measuring device according to the invention can be used for measuring an object by positioning the measuring probe at one or more points on the circumference of the object in question, wherein the processing device automatically produces a possible contour of the object corresponding with said points, or by moving the measuring probe continuously along the circumference of the object to be measured.

Measuring at discrete points can be carried out, for example, when the object to be measured has a shape which is known per se, for example a polygonal shape. By positioning the measuring probe at the corner points, such an object can be measured quickly. In the case of complex shapes or of precision measurement, it is preferred to move the measuring probe along the circumference of the object to be measured.

In another embodiment of the measuring device according to the invention a measuring-probe is provided which includes a pivotable ball- or sphere-shaped top, in the centre of which the cord or the wire is attached. This measuring probe is in particular suitable for tipping points on an object to be measured, for example in the case of a frame or the like to be measured, independently of the position of the probe.

For calibration purposes, the measuring probe is positioned at a reference point prior to measuring an object, wherein the measurement is calibrated in relation to said reference point.

The invention furthermore relates to a method for measuring an object by means of a measuring device as described above, wherein the measuring data obtained by moving a measuring probe, which data is representative of linear changes and angle changes of the cord or the wire, is subjected to correction operations, among which radius correction of the reel on which the cord or the wire is wound, compensation of vibrations in the measuring arm coupled to the cord or the wire, measuring point and line filtering and offset correction in relation to the dimensions of a measuring pin or measuring top of a measuring probe.

The measuring device according to the invention makes it possible to measure objects very accurately, in the order of tenths of a millimeter, and quickly, and the measuring data can be fed directly to a graphic apparatus or drawing apparatus for providing a graphic representation of the measured object and/or to machining apparatus for directly and automatically producing the object, for example in accordance with the DIN ISO code.

The measuring device according to the invention will be explained in more detail hereafter by means of exemplary embodiments.

DETAILED DESCRIPTION OF THE INVENTION

Figure 1:
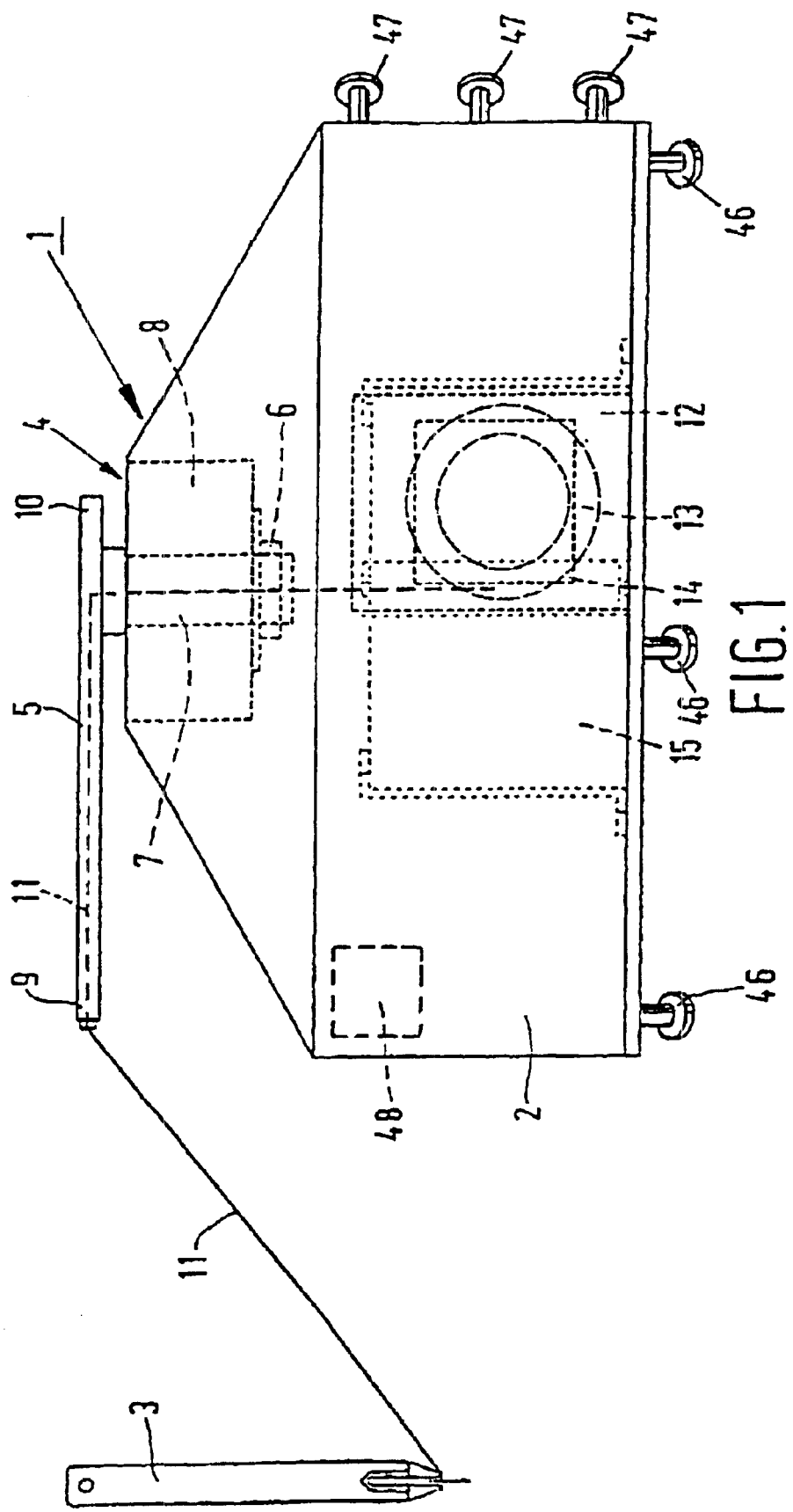
FIG. 1 is a schematic side view of an embodiment of the measuring device according to the invention for measuring two-dimensional objects.

FIG. 1 schematically shows, in side view, an embodiment of a measuring device 1 according to the invention, comprising a housing 2 in the form of a trapezium, and a measuring probe 3. An arm 5, which is rotatably supported in a precision ball bearing 6, is disposed on the upper side of the housing 2. The arm 5 rotates through an angle of 360°±20° in clockwise and in anti-clockwise direction in an imaginary plane parallel to the upper surface 4 of the housing 2. Arm 5 is supported in the centre of housing 2 in the illustrated embodiment.

Point of support 7, in which the arm 5 is rotatably supported, is connected to a sensor 8 for measuring the angle or angular displacement of arm 5 in said imaginary plane. A cord or wire 11, which is connected to the measuring probe, extends from the free end 9 of arm 5.

The cord or the wire 11 extends via arm 5 and point of support 7 to a tensioning and roll-up mechanism 12 comprising a biassed, pre-set reel 13, on which the cord or the wire 11 is wound. The spring tension on reel 13 acts to exert a constant force on the cord or wire 11 in the direction of the housing 2.

Connected to said tensioning and roll-up mechanism 12 is a sensor 14 for measuring the angular displacement of the reel 13, which is an indication of the length of the cord or wire 11 to the measuring probe 3, or a change in length of the cord or the wire 11 resulting from the movement of the measuring probe 3 towards or away from the housing.

Broken lines 15 schematically indicate electronic supply and processing equipment arranged within housing 2.

Figure 2:
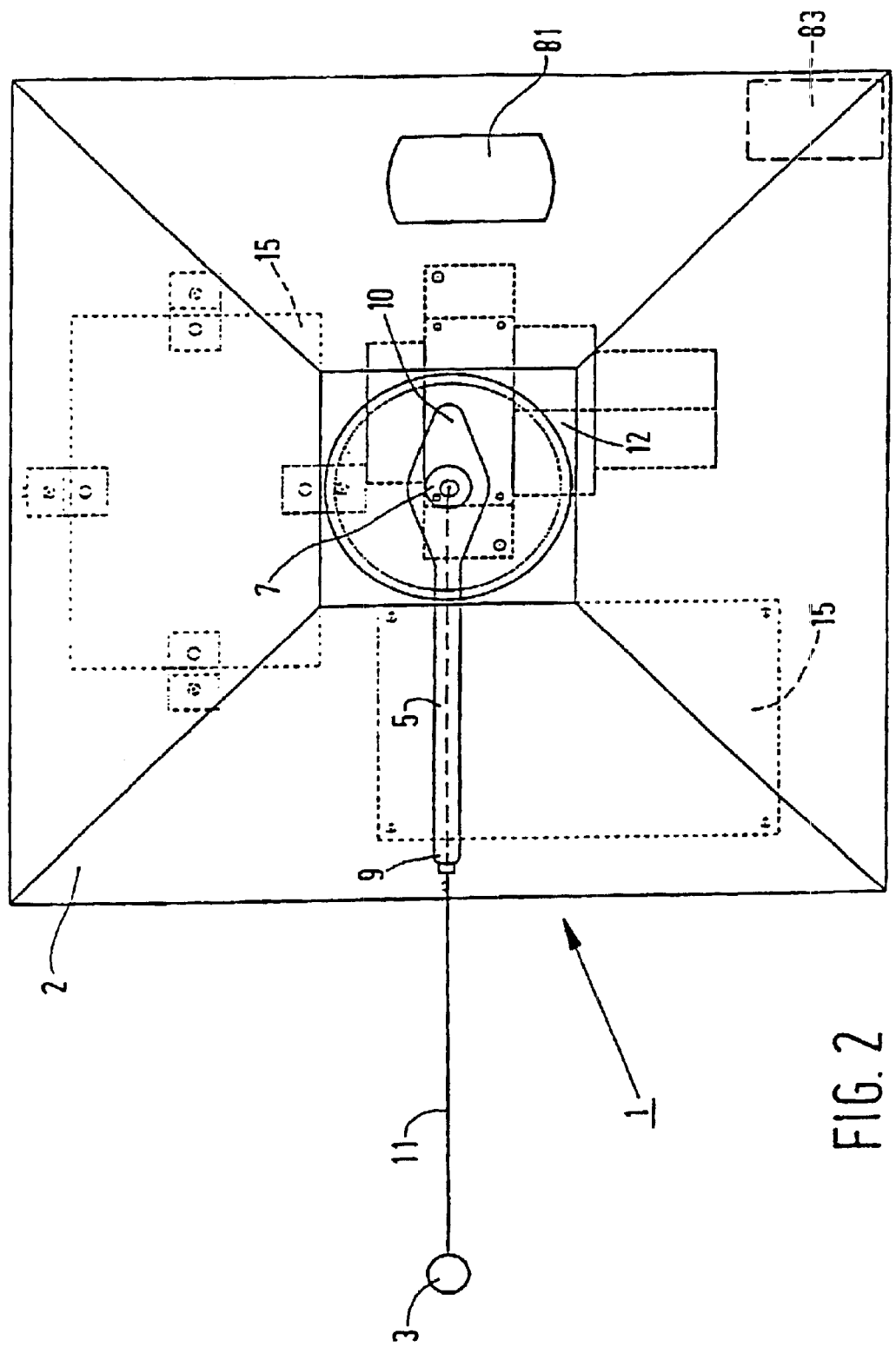
FIG. 2 is a schematic top plan view of the device of FIG. 1.

FIG. 2 is a view of the upper surface 4 of the trapezoidal housing 2 of the measuring device according to FIG. 1.

Arm 5 is configured with a widened portion near its point of support 7 and the other end 10 of arm 5 extends in a direction away from point of support 7 over some distance with a view to achieving a precise equilibrium of arm 5 in an imaginary flat plane. The part of the arm at end 10 is so dimensioned as regards its weight that arm 5 as a whole is kept in precise equilibrium in an imaginary plane parallel to the upper surface 4 of the housing. If desired, the end 10 of arm 5 may be provided with adjusting means (not shown) for precise balancing of arm 5.

Figure 3:
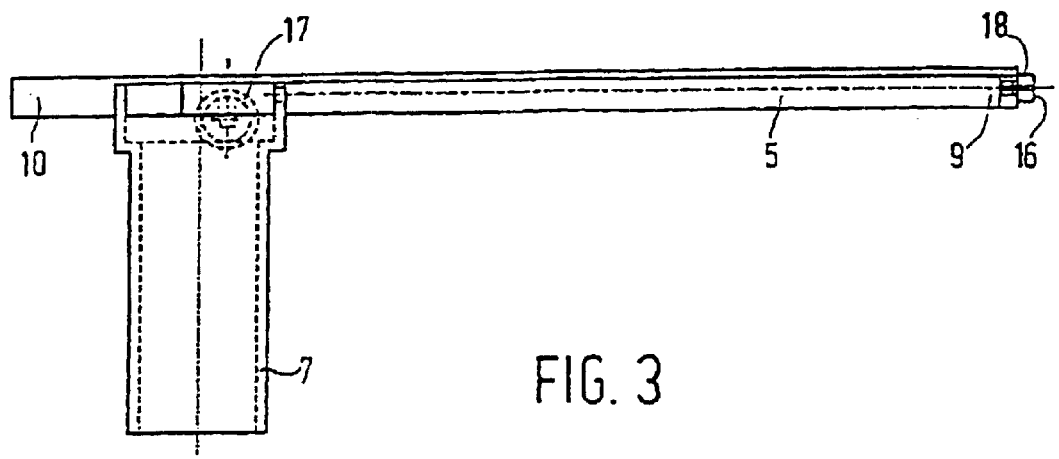
FIG. 3 schematically shows, on an enlarged scale, the manner in which the arm and the cord or the wire engage each other in one preferred embodiment of the device according to the invention.

FIG. 3 is a larger-scale side view of the arm 5. Arm 5 is provided with an opening 16 at its free end 9, through which the cord or wire 11 extends. Preferably, opening 16 is so configured that dirt is scraped off the cord or the wire 11 before the cord or the wire is wound onto the reel 13. Arm 5 is provided with a guide wheel 17 near point of support 7, which guide wheel is disposed in such a manner that the cord or the wire 11 extends precisely through the centre of the point of support 7 of arm 5.

For an accurate measurement of the angle or angular displacement of the cord or the wire 11 resulting from the movement of the measuring probe 3 it is essential that the arm 5 be in line with the cord or the wire as much as possible. In order to achieve this, the diameter of opening 16 must be precisely adapted to the diameter of the cord or the wire 11. In a practical embodiment a clearance in the order of 0.1 mm between the cord or the wire 11 and the opening 16 is used. By using a plastic part 18 to be coupled to the free end 9 of the arm 5, in which part the opening 16 is present, deviations in the alignment between the arm 5 and the cord or the wire 11 caused by wear or by widening of the opening 16 can easily be overcome by fitting a new part 18.

The construction of arm 5 must be as light-weight as possible, which is according to the invention achieved by manufacturing the arm 5 from a light-weight material, such as aluminium or plastic, and by designing the arm so that a minimum amount of material is needed. Sufficient mechanical rigidity in the longitudinal direction of the arm must be retained, however, for aligning the arm and the cord or the wire 11 and having the arm 5 rotate as accurately as possible in an imaginary plane parallel to the upper surface 4 of the measuring device.

In an embodiment of the invention, in order to keep the starting moment of arm 5 furthermore as low as possible, precision bearings are used, such as a ball bearing which is known per se, wherein the balls and the bearing cups have been selected for high precision and accuracy. Furthermore, a low adhesion lubricant is used. These measures result in a starting moment, that is, the force that is required to set the arm 5 in rotation from standstill, of less than 0.03 Ncm. A small starting moment is required for measuring small angular displacements of the cord or the wire 11, in particular in case of a great length thereof. In a practical embodiment of the measuring device according to the invention the arm 5 has a length of 20–30 cm.

Figures 4, 5:
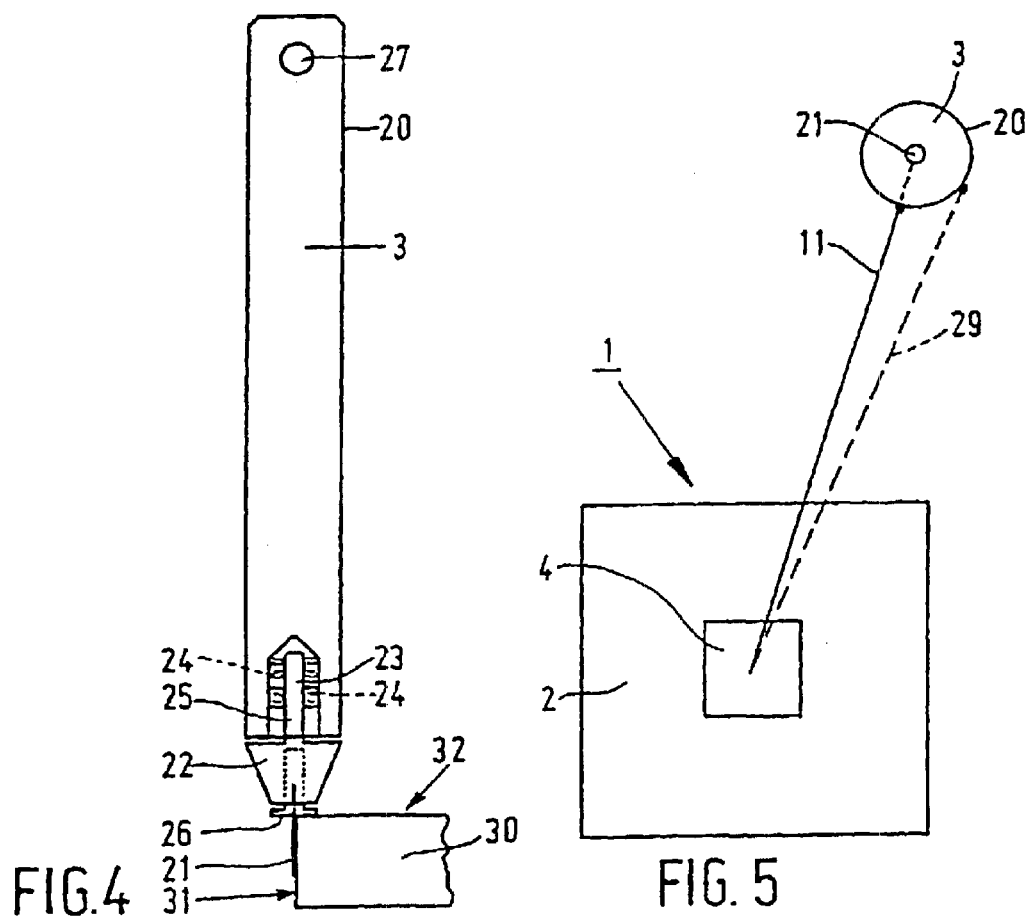
FIGS. 4, 6, 7, 8 and 9 are schematic, partially sectional, elevational and perspective views of preferred embodiments of the measuring probe according to the invention.
FIG. 5 schematically shows the manner in which the cord or the wire engages the measuring probe according to FIG. 4 during use thereof.

FIG. 4 shows an embodiment of the measuring probe 3 of the measuring device according to the invention, partially in elevation and partially in section. Measuring probe 3 is elongate in shape and it comprises a grip 20 for holding the measuring probe 3 and a measuring pin 21 that is rotatably supported in grip 20.

As can be seen in the figure, the measuring pin 21 is mounted in a holder 22, which engages in a bore 25 in grip 20 via a shaft 23 and ball bearings 24. Preferably, double bearings 24 are used as shown. The cord or the wire 11 is attached near holder 22 and measuring pin 21.

In order to enable easy positioning of the measuring probe 3 on the circumference 31 of an object 30, measuring pin 21 is designed to have a certain length, and a supporting surface 26 extending perpendicularly to the measuring pin 21 is formed so as to position the pin as perpendicularly as possible to the surface 32 of an object 30 to be measured.

As is schematically shown in FIG. 5, owing to the rotatable support in bearings of the measuring pin 21 with respect to grip 20 of he measuring probe 3, it is ensured that the cord or the wire 11 will be in a straight line with the radius of measuring probe 3 to the measuring pin 21 at all times, in order to prevent measuring errors resulting from measuring probe 3 being pivoted in longitudinal direction. This may occur in a situation wherein the cord or the wire 11 is fixedly connected to the grip 20 of the measuring probe 3, as is illustrated by the broken line 29 in FIG. 5. Line 29 indicates the course of the cord or the wire when said cord or the wire is fixedly attached to the measuring probe 3, that is, not via a pivoted part, and the measuring probe 3 is held against an object while being pivoted about its axis in longitudinal direction.

A person skilled in the art will appreciate that the cord or wire 11 must be made of a material that is as low-stretch as possible in order to be able to detect small changes in length as well, in particular when the cord or the wire 11 is very long. It has become apparent that low-stretch steel wire and for example so-called paraleine cord has characteristics that are suitable for the purpose of the invention. Paraleine cord or wire having a diameter of 1 mm possesses a tensile strain of 1 daN, 0.4% at 3 daN and 0.9% at 10 daN. Also other types of cord or wire can be used, of course, and the spring tension of the tensioning and roll-up mechanism 12 must be suitably selected.

Figure 6:
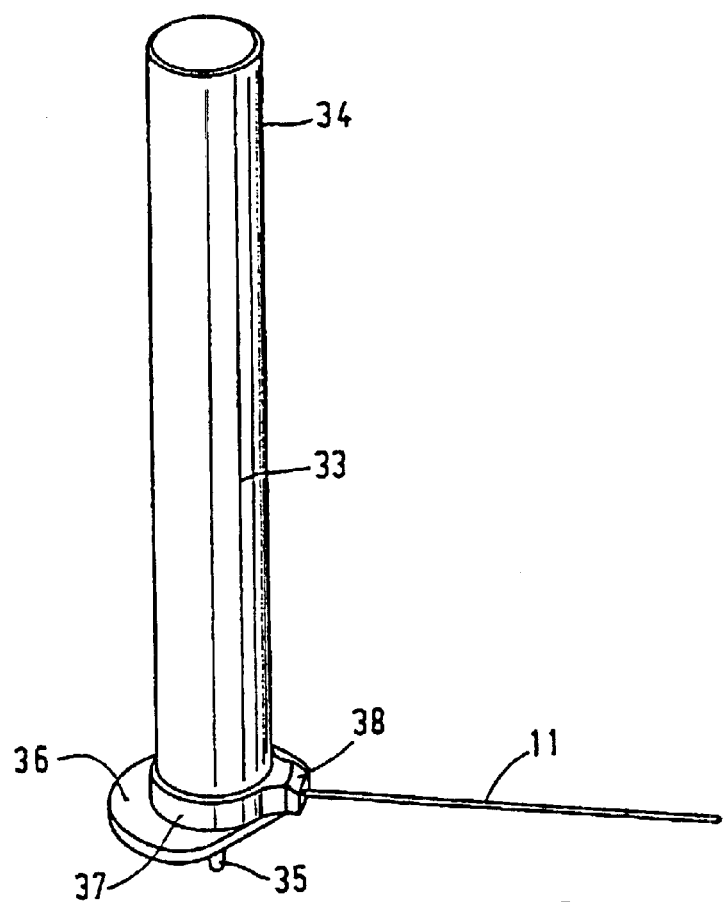

FIG. 6 is a perspective plan view of another embodiment of a measuring probe 33 of the measuring device according to the invention. Like measuring probe 3, measuring probe 33 is elongate in shape, comprising a grip 34 for holding the measuring probe 33, a measuring pin 35 rotatably accommodated in grip 34, and an approximately semicircular platform 36. The diameter of the semicircular platform 36 is larger than the diameter of grip 34. A ring 37 is rotatably connected to grip 34 at the end of measuring pin 33 that is disposed near measuring pin 35 and platform 36. Ring 37 includes a projection 38, in which the cord or the wire 11 is secured, for example by being clamped down therein.

Measuring pin 35 and platform 36 can be supported in grip 34 in the same manner as described above with reference to measuring probe 3. Any type of bearing that is sufficiently precise and suitable for the purpose of the invention, such as a cylindrical plain bearing or the like, can be used.

As has been explained with reference to FIG. 5, owing to the rotatable bearing of measuring pin 35, platform 36 and ring 37 with respect to grip 34 of the measuring probe 33 it is ensured that the cord or the wire 11 will be in a straight line with the radius of grip 34 of the measuring probe 33 at all times.

Measuring probe 33 with its semicircular platform 36 is in particular suitable for measuring contours of an object 30 by moving the measuring pin 35 along the circumference of the contour, wherein the platform 36 rests on a surface of said object.

Figure 7:
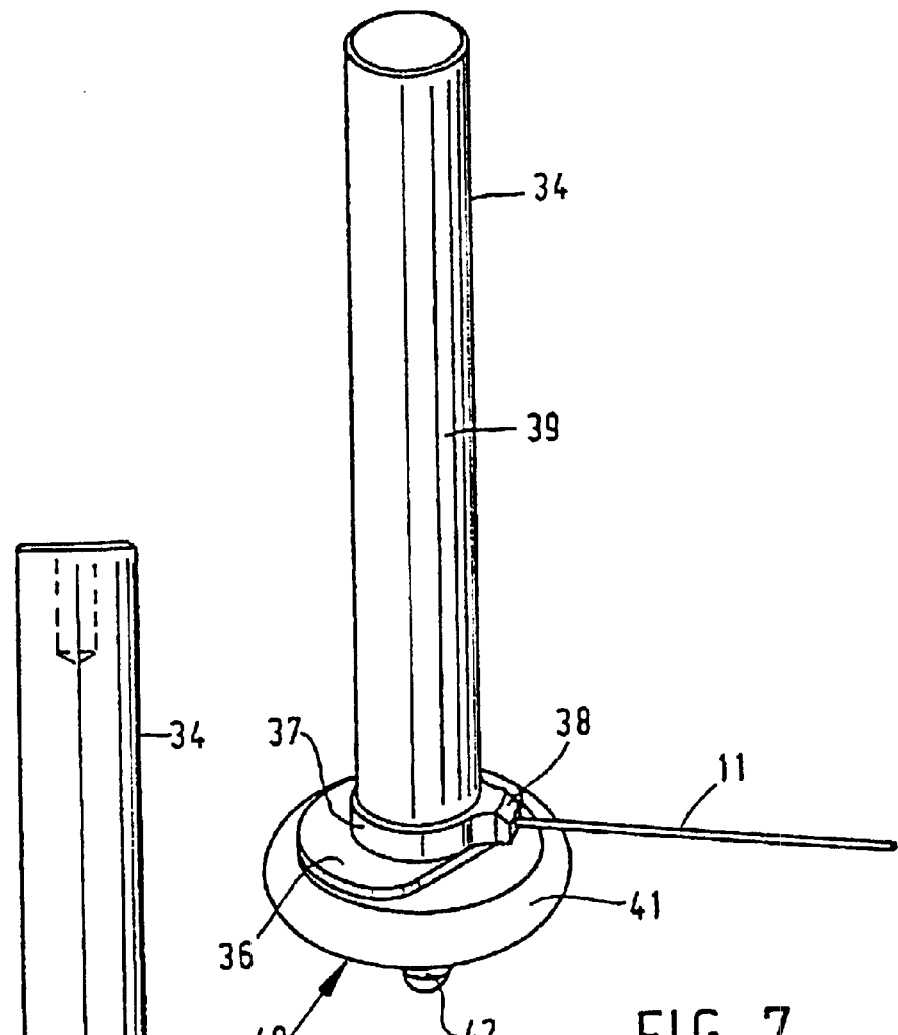

FIG. 7 is a schematic, perspective view of yet another embodiment of a measuring probe 39 for use in a measuring device according to the invention. Measuring probe 39 is substantially identical to measuring probe 33 as regards its design, with this difference that an exchangeable, hat-like measuring pin 40 is fitted over the measuring pin 35.

Figure 8:
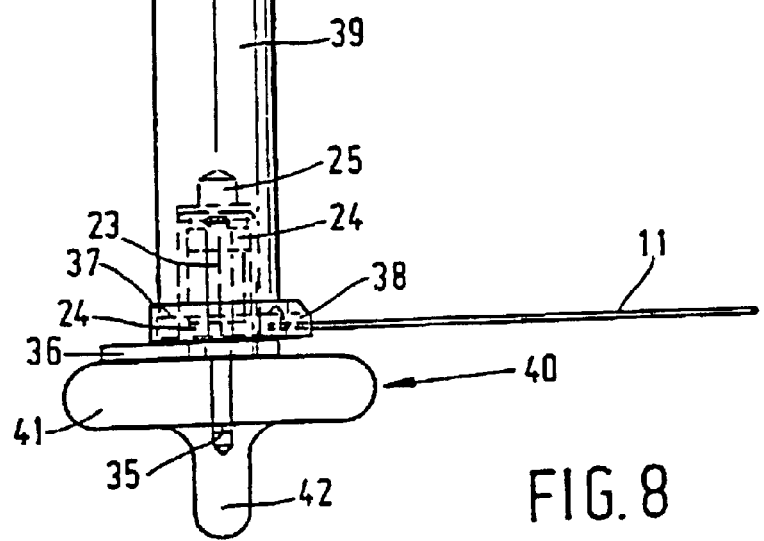

FIG. 8 is a schematic view, partially in section and partially in elevation, of the measuring probe 33, wherein the hat-like measuring pin 40 is clearly shown. Measuring pin 40 consists of a circular disc 41 having a rounded edge and a central, elongate cylindrical projection 42 with a rounded top, it is in particular intended for measurements along objects having a rough surface so as to prevent the measuring pin 35 from being damaged.

Measuring probe 39 is again in particular suitable for measuring contours of an object, it has a fixed offset that is determined by the size of projection 42.

Figure 9:
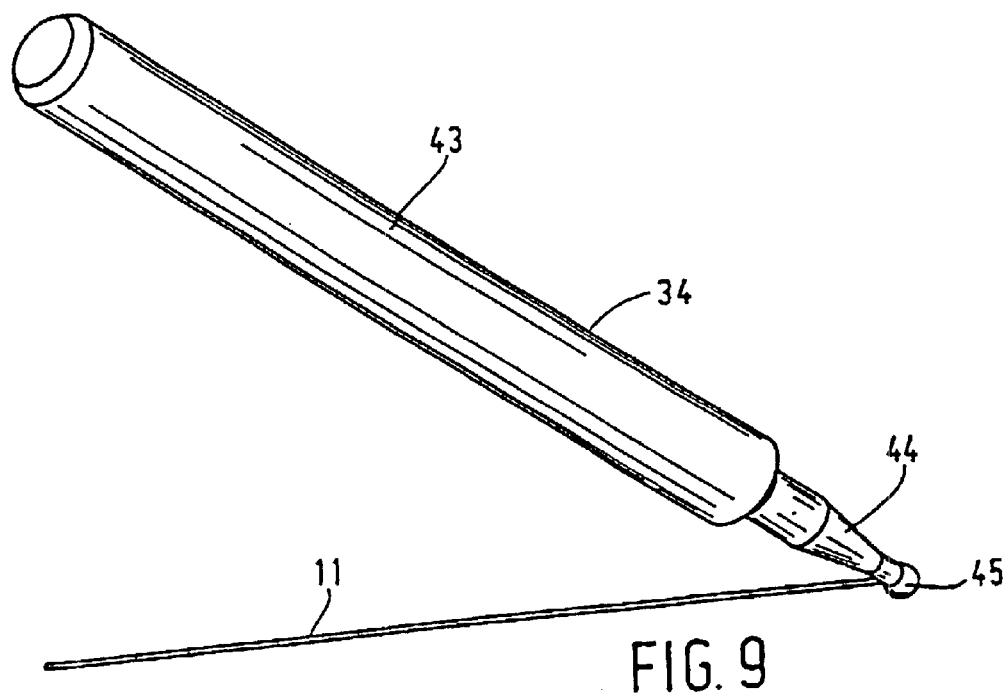

FIG. 9 is a schematic, perspective view of yet another embodiment of a measuring probe 43 of the measuring device according to the invention, comprising a conical measuring pin 44 having a spherical top 45, which is rotatably supported in grip 34. Spherical top 45 has a diameter of about 3 mm in one embodiment thereof, wherein the cord or the wire 11 terminates precisely in the centre of spherical top 45. Measuring probe 43 is in particular suitable for use as a so-called "pointer" for measuring in corners of an object to be measured, such as a door frame or a window frame, for example. Owing to the fact that the top 45 is rotatably supported, the position of the grip 34 does not affect the measurement.

Depending on the specific shape of the object to be measured, further measuring probes can be developed for use with the measuring device according to the invention, which probes are all considered to be incorporated in the present patent application.

Figure 10:
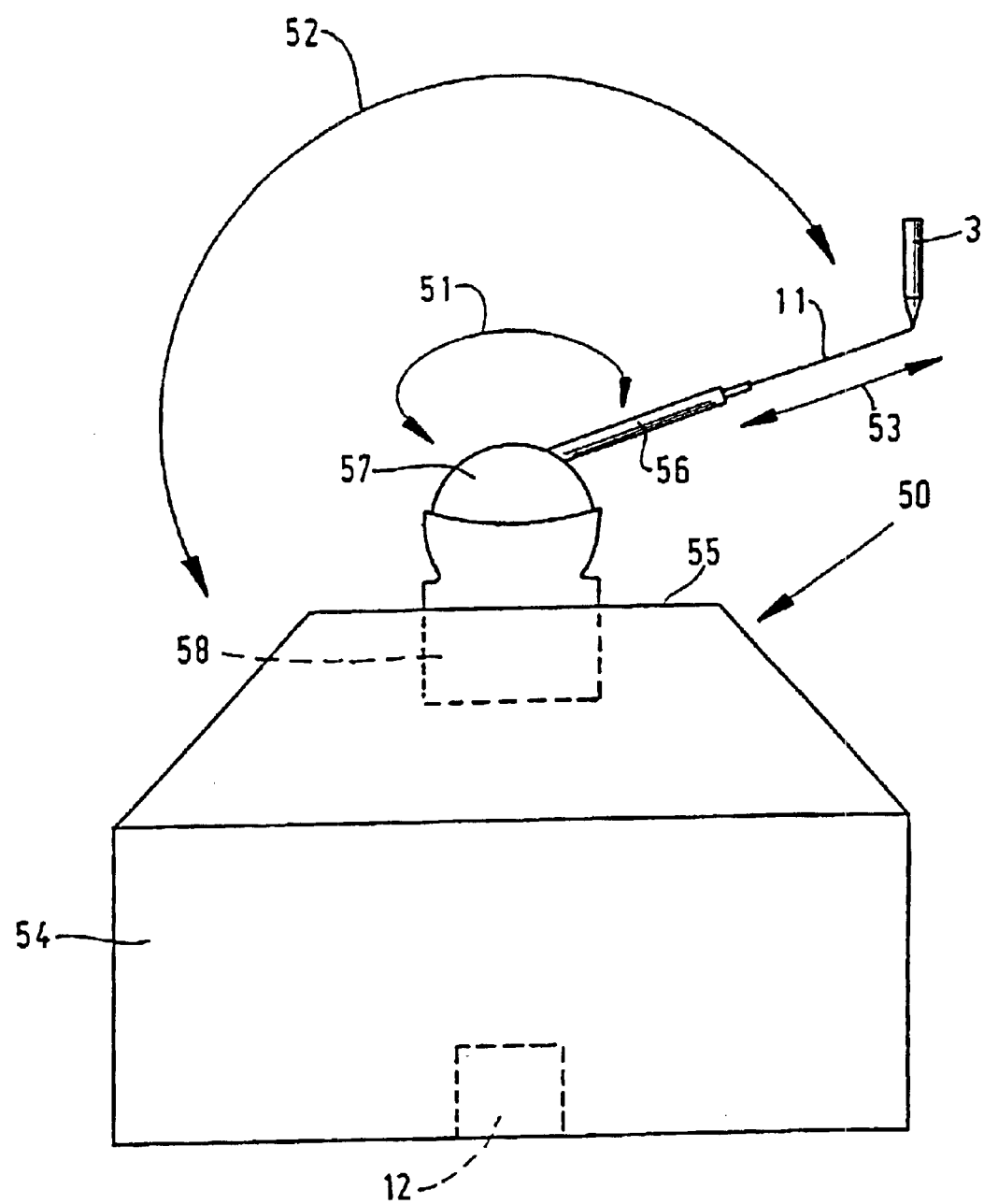
FIG. 10 is a schematic side view of an embodiment of the measuring device which is suitable for measuring three-dimensional objects.

FIG. 10 shows an embodiment of a measuring device 50 according to the invention, comprising a trapezoidal housing 54, on an upper surface 55 of which a swingably supported arm 56 is disposed.

In the illustrated embodiment arm 56 is provided with a ball joint 57 at one end.

Coupled to the ball joint 57 is a sensor 58 which is capable of measuring the rotation of the arm 56 in two degrees of freedom, for example in an imaginary plane parallel to the upper surface 55 of housing 54, as is indicated by means of a curved arrow 51, and in an imaginary plane perpendicularly to the upper surface 55, as is indicated by means of a curved arrow 52.

The measuring device 50 further comprises a measuring probe that is connected to a cord or the wire 11, such as the measuring probe 33, for example, and an associated tensioning and roll-up mechanism 12, 13 including a sensor 14, for measuring distance or changes in distance, as indicated by means of arrow 53 and described in the foregoing.

Three-dimensional contours of objects can be measured accurately with the measuring device 50. Also in this case the starting moment of ball joint 57 must be as small as possible, which can be achieved by a careful selection of the bearing parts and the lubricant that are used, as has been explained in the foregoing.

Like measuring device 1, measuring device 50 has the advantage that it can be designed as a portable, transportable unit for measuring small objects placed on a measuring table, for example, or larger objects that are present in a space.

Figure 11:
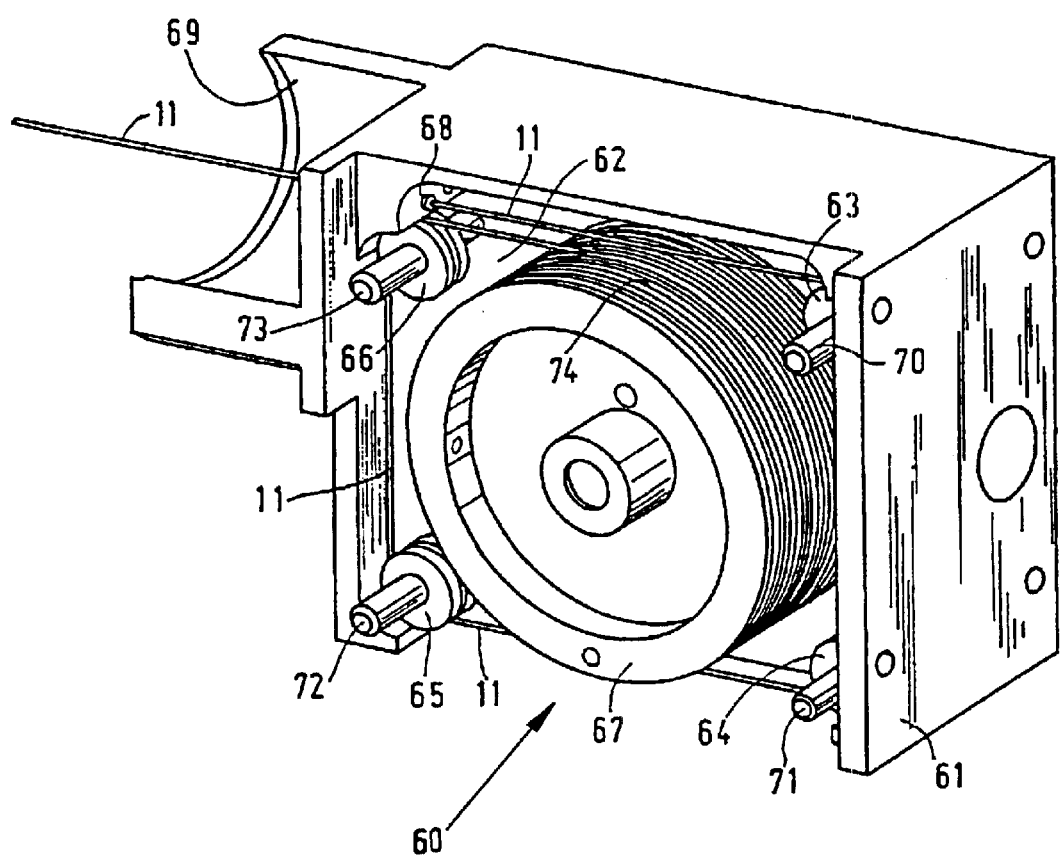
FIG. 11 is a schematic, perspective view of a preferred embodiment of a tensioning and roll-up mechanism for use in the measuring device according to the invention.

FIG. 11 is a schematic, perspective view of a preferred embodiment of a tensioning and roll-up mechanism 60 for winding and unwinding the cord or the wire 11, as has been explained in the foregoing with reference to the tensioning and roll-up mechanism 12 of FIG. 1.

The tensioning and roll-up mechanism 60 comprises an approximately square, box-shaped frame 61 including a bottom 62, near the corner points of which rotatably supported guide wheels or guide rollers 63, 64, 65 and 66 are disposed. Guide wheels 63, 64, 65 and 66 are movable in the direction of their respective supporting shafts 70, 71, 72 and 73.

A reel 67 is rotatably mounted in bearings between the guide wheels. Frame 61 is provided with an opening 68 near one side, which opening connects to a spout 69 extending in outward direction from 61. The cord or the wire 11 extends via spout 69 and opening 68, via guide wheels 63, 64, 65 and 66, respectively, to reel 67.

In the illustrated embodiment a groove 74 is present in the outer surface of reel 67, the depth of which groove is adapted to the diameter of cord or the wire 11 so as to prevent deformation of the diameter of the cord or the wire 11. The reel 67 is furthermore provided with spring means (not shown) for winding and unwinding the cord or the wire 11 under spring tension. The operation of the tensioning and roll-up mechanism 12 is as follows.

The cord or the wire 11 that can be moved into or out of frame 61 via opening 68 is guided, via rotatably supported guide wheels 63, 64, 65, 66 that are movably in the longitudinal direction of their respective shafts 70, 71, 72, 73, in such a manner that the cord or the wire 11 will follow the spiral groove 70 of reel 67. This prevents the cord or the wire 11 from heaping up upon being wound onto the reel 67, which would introduce an error in the measurement. After all, the length of the cord or the wire 11 is determined on the basis of the degree of revolution of reel 67. This means that the exact diameter of the reel 67 must be known. The heaping up on reel 67 of layers of cord or the wire 11 in fact corresponds to unknown diameter changes of reel 67, as a consequence of which the length of the pulled-out cord or the wire can no longer be accurately determined from the degree of revolution of reel 67.

Another advantage of the use of the tensioning and roll-up mechanism 60 is that it prevents the cord or the wire 11 from being flattened upon being wound up as a result of several layers of cord or the wire 11 being wound one on top of another. Flattening of the cord or the wire 11 would in turn lead to an unknown deviation in the determination of the length thereof, and thus to an unknown measuring error.

Sensors for measuring angles or angular displacement that are suitable for the purpose of the invention are known per se in practice. Although potentiometers can be used for this purpose, for example, the preferred embodiment of the invention employs sensors in the form of pulse generators. Use is thereby made of a rotatably disposed disc, which is provided with marks that interrupt a light beam upon rotation. The pulses that are thereby generated indicate the degree of rotation of the disc, whereby angular displacement or a change in length can be readily calculated on the basis of the spacing between the marks. Also other suitable pulse generators can be used, of course, such as pulse generators that employ sliding contacts. For the purpose of the invention it is desirable, however, to use sensors with a minimal amount of mechanical friction. The electric components 15 disposed in the housing provide a suitable conversion of the measuring signals from the sensors into position data of the measuring probe for driving a plotter, for example, or other apparatus for graphically representing position data obtained with the measuring device according to the invention, or for driving a machining apparatus for producing an object corresponding to the position data.

Figure 12:
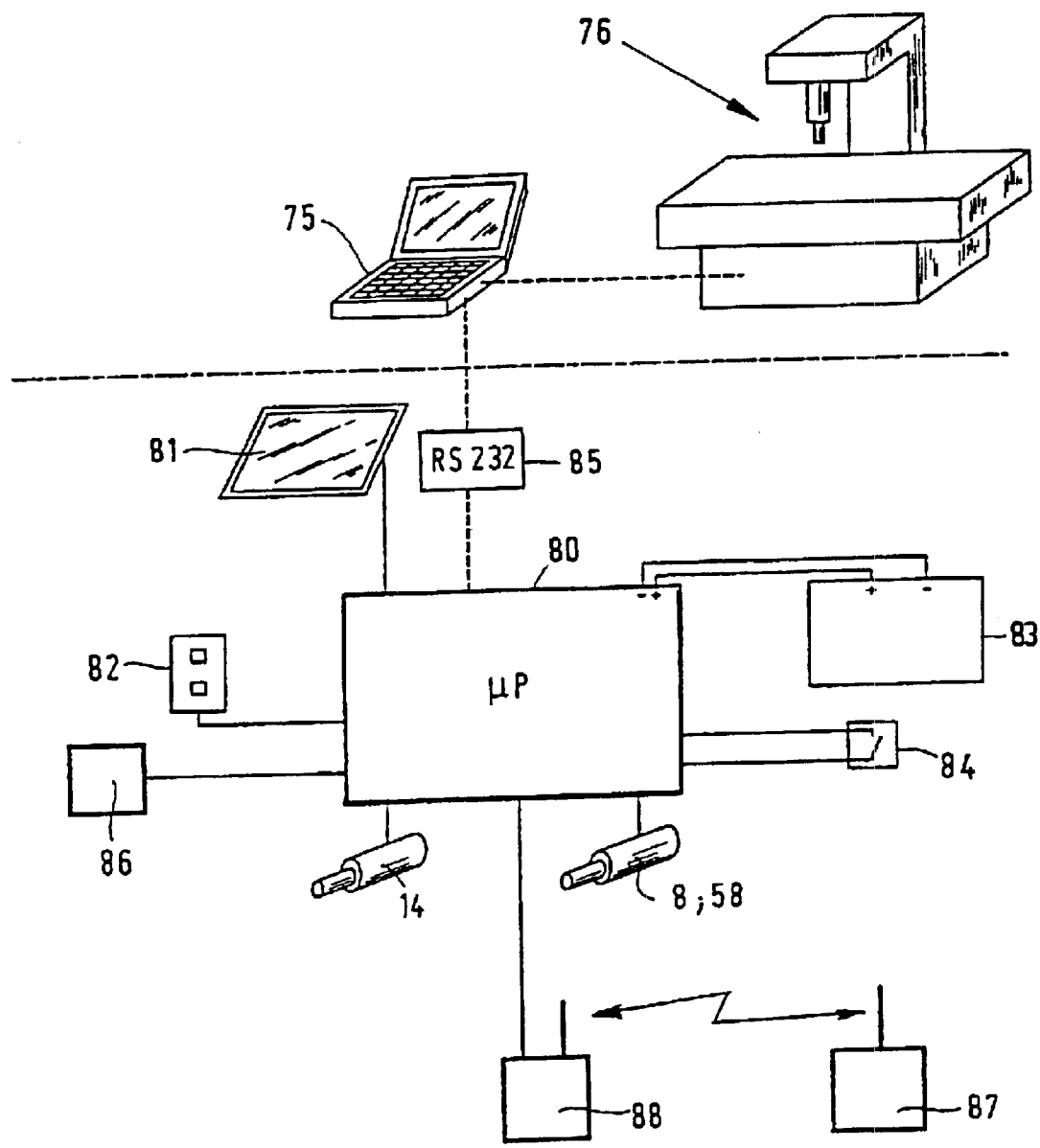
FIG. 12 is a simplified electric wiring diagram of the measuring device according to the invention.

FIG. 12 is a simplified electric block diagram of the electronic components 15 of the measuring device according to the invention, and also of the connection thereof to a desk computer or portable computer (laptop) 75 and to a machining apparatus and/or plotter 76.

The electronic components 15 comprise a processing device 80, for example in the form of a microprocessor, to which a display unit 81 (see also FIG. 2), a control panel 82, which communicates by wire or by remote control, a power supply 83, for example in the form of an exchangeable battery (see also FIG. 2), an on/off switch 84, a wireless transceiver unit 88, which communicates with an input unit 87 by wireless remote control, and the sensors 8, 14 and 58 are connected.

Depending on the type of cord or wire 11 that is used, the length thereof will also be influenced by ambient conditions, such as the temperature and the humidity level. In order to correct for these influences, suitable sensors 86 are provided, such as a temperature sensor and a humidity sensor, and the processing device 80 includes suitable software for correcting the computed changes in length of the cord or the wire 11 in dependence on the measured temperature and humidity level.

The processing device 80 converts the signals received from sensors 8, 14, 58 into position data from the measuring probe and makes this data available on an interface 85, preferably a standardized computer interface, for example type RS 232 or the like. Software that is suitable for this purpose is known per se in practice and requires no further explanation.

The position data made available on interface 85 can be processed by means of a desk computer or a portable computer 75 that is provided with suitable software for driving a plotter or a processing machine 76. The measuring data can also be used directly, if desired, for logistic and project management purposes, purchasing, etc. Software that is suitable for this purpose is commercially available per se.

Although the measuring device according to the invention may be in the form of a separate unit to be connected to a desk computer or a portable computer, and graphic or plotting apparatus and/or machining apparatus, the invention also provides a measuring device wherein the functions of the desk computer or the portable computer and the measuring device are combined into one unit, wherein said unit may also be integrated in graphic or plotting apparatus but also in machining apparatus for directly producing measured objects or products, project management, purchasing, etc.

The measuring device according to the invention as discussed in the foregoing is suitable for measuring an object, for example by positioning the measuring probe 3, 43 at discrete points on the circumference of the object, for example in the corner points of a polygon that is known per se, or by continuously following the contour or circumference to be measured by means of a measuring probe 3, 33, 39.

In the first case means are provided for storing the measuring data from the sensor when a measuring probe 3, 43 has been positioned at a specific point of the object to be measured, for example a push button 27 on measuring probe 3, which communicates with the processing device 80 by electric, radiographic, acoustic or optical means, or the separate input unit 87, by means of which registration commands can be transmitted to the processing device 80.

For continuous contour measurement the processing device 80 polls the sensors 8, 14, 58 periodically, at a speed that suffices for measuring very small deviations, in the order of 0.1 mm, upon normal movement by hand of the measuring probe 3, 33, 39. In a practical embodiment about 2000 measurements/second are carried out.

For precise measurement it is furthermore preferred to position the measuring probe at a reference point for calibration of the measurement prior to measuring an object.

Likewise for calibration and alignment purposes, housing 2 of the measuring device 1, as shown in FIG. 1, is provided with adjusting feet 46 and 47. By means of said adjusting feet the housing 1 can for example be precisely aligned in horizontal or vertical direction with an object to be measured.

In an even more advanced embodiment of the measuring device 1 according to the invention, said measuring device comprises an alignment system 48, for example a laser-controlled alignment system. It will be apparent that the alignment only applies to a measuring device which is restricted to measurements in a two-dimensional plane, such as measuring device 1. measuring device 50, on the other hand, as shown in FIG. 10, does not necessarily need to include alignment means 46, 47, 48, since this measuring device 50 is suitable for three-dimensional measurements.

As has been explained in the foregoing, the data flow that is to be processed by the processing device 80 comprises data concerning the length of the cord or the wire 11 and the angular displacement of arm 5; 48. This data is provided in raw form by sensors 8, 14, 58. The further processing of said data includes several processing and correction steps.

Figure 13:
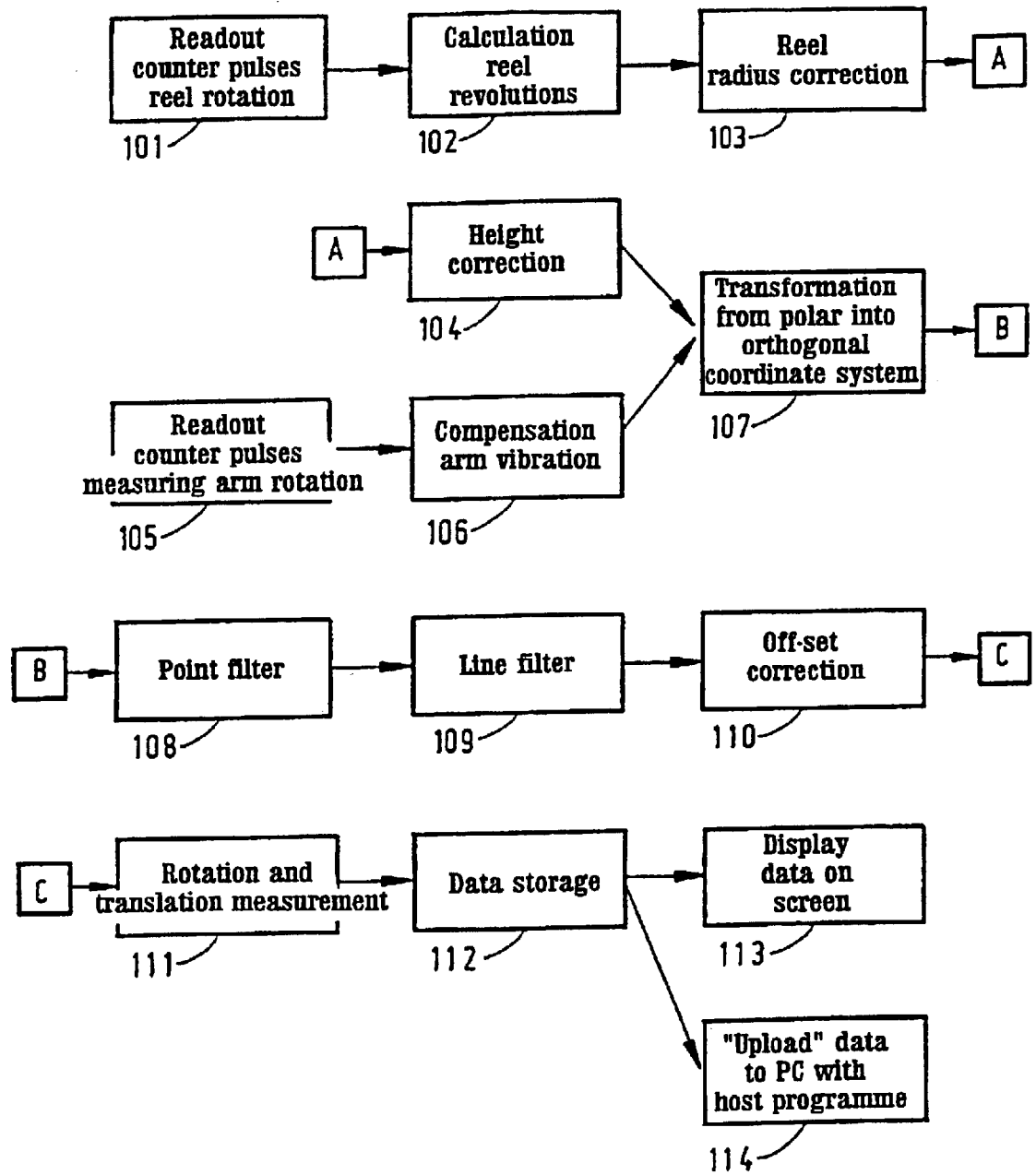
FIG. 13 schematically shows the various processing and correction steps in an embodiment of the measuring device according to the invention.

FIG. 13, schematically shows the various processing and correction steps in an embodiment of the measuring device according to the invention, under the control of the processing device 80. Blocks "A", "B" and "C" indicate points corresponding to each other.

Block 101, readout counter pulses reel rotation, relates to the determination of the length of the cord or the wire 11 on the basis of the degree of revolution of reel 13, 67 by means of sensor 14, which is in the form of a pulse generator in a preferred embodiment of the invention. The number and the fraction of the revolutions of the reel 13, 67 is determined from the momentaneous registration of an adder-subtracter and a constant that represents the number of pulses per complete revolution, block 102, calculation reel revolutions. The length of the unwound cord or the wire 11 is proportional to the number of revolutions of the reel 13, 67. The distance from the point of inflection of the cord or the wire 11 to the point of contact of the reel 13, 67 is not constant, however. The more wire that is wound on reel 13, 67, the larger this distance will become. This additional (internal) length of the wire is compensated in block 103, reel radius correction.

Furthermore, in the case of measuring device 1, the measuring point may lie outside the plane in which arm 5 rotates. The difference in height, that is, the distance between the plane in which arm 5 rotates and a plane parallel thereto through the measuring point, is input by the user. This difference in height is compensated in block 104, height correction.

Sensors 8; 58 are provided for determining the angular displacement of arm 5; 56, which sensors are likewise in the form of pulse generators. Also in this case the number of pulses is stored by means of an adder-subtracter, block 105, readout counter pulses measuring arm rotation.

Movement of the measuring probe sets the cord or the wire 11 vibrating. This vibration results in an oscillating movement of arm 5; 56 and thus in a potential measuring inaccuracy. This oscillation is measured dynamically and the measured value is used for making a correction, block 106, compensation arm vibration.

The data thus obtained, which has been measured in a polar coordinate system, is converted into an orthogonal coordinate system in block 107. This is done because the commercially available processing software is primarily based on an orthogonal coordinate system. Conversion software suitable for this purpose is known per se in practice. A person skilled in the art will appreciate that this conversion can be omitted, of course, by processing the results in a polar system.

Blocks 108 and 109 provide filtering of the converted data, wherein block 108, point filter, is operative for filtering out successive measuring points that are not spaced apart far enough. In the case of successive points lying on a straight line, within a given tolerance, the intermediate points are likewise filtered out in block 109, line filter. Instead of using an approach based on straight lines, it is also possible to use an approach based on short arch portions.

As a result of the limited diameter of measuring pin 21, 35, 42 or of spherical top 45, the contour or position that is measured is not an exact contour or position, but a contour which deviates to the left or to the right over a distance of half the diameter of a measuring pin, or the top. The user needs to input whether the contour or position to be measured is positioned to the left or to the right of the measuring device. The measuring values are subsequently corrected in block 110, offset correction.

Furthermore the user can indicate in block 111, rotation and translation measurement, in which way the measurement must be positioned in the orthogonal coordinate system. For example whether the origin is in the first or in the last measuring point, in what direction the x-axis extends, that is, from the first to the second and next measuring points, etc.

During the measurement the data is stored in the main storage of the measuring device. Once the measurement is complete and all operations have been carried out, the data thus obtained is stored in a backing store, block 112, data storage.

After scaling and translation, the measuring data is displayed on screen 81, in such a manner that all measuring points can be displayed on the screen, block 113, displaying data on screen.

In order to use the data obtained from the measuring device, said measuring device can be connected, via an interface 65, to a computer, such as a personal computer, a laptop 75 or other computer, on which a so-called host programme runs. By means of this programme the measuring data can be fed to a processing device 76 for further processing; block 114, "upload" data to PC with host programme.

Although the invention has been explained in the foregoing by means of exemplary embodiments of the measuring device according to the invention, it will be appreciate that the inventive concept can be realised in several ways within the scope of the following claims.

What is claimed is:

1. A measuring device comprising:
    a movable measuring probe; and
    first and second sensors, coupled to the measuring probe, configured to provide position data of the measuring probe;

wherein the measuring probe is coupled, by a cord or a wire, to the first sensor to measure a length or change in length of the cord or the wire, and to the second sensor to measure an angle or angular displacement of the cord or the wire, which second sensor is coupled to an elongate, rotatably supported arm, in a longitudinal direction of which the cord or the wire engages the arm, wherein the arm is spatially rotatably supported at a first end by a sphere or ball type bearing, and the second sensor is configured to measure rotation of the arm in two degrees of freedom.

2. A measuring device according to claim 1, wherein the arm is coupled to the second sensor at the first end, and is provided at a second free end with an opening adapted to a thickness of the cord or the wire, through which opening the cord or the wire can be moved.

3. A measuring device according to claim 1, wherein the arm is supported in a precision bearing having a smallest possible starting moment.

4. A measuring device according to claim 1, wherein the arm is made of a lightweight material.

5. A measuring device according to claim 1, wherein the first sensor is coupled to a tensioning and roll-up mechanism configured to keep the cord or wire tensioned under influence of spring tension and to automatically roll up the cord or wire.

6. A measuring device according to claim 5, wherein the tensioning and roll-up mechanism comprises a rotatably supported reel, with an outer surface provided with a spiral groove that has a depth adapted to the diameter of the cord or the wire, and movably supported guide wheels configured to guide the cord or the wire to follow the spiral groove of the reel.

7. A measuring device according to claim 1, wherein the measuring probe is elongate in shape, comprising a grip configured to take hold of the measuring probe and a pin-shaped end rotatably supported with respect to the grip, to which end the cord or the wire is attached.

8. A measuring device according to claim 1, wherein the measuring probe is elongate in shape, comprising a grip configured to take hold of the measuring probe and a ball- or sphere-shaped top rotatably supported with respect to said grip, in a center of the ball- or sphere-shaped top the cord or the wire is attached thereto.

9. A measuring device according to claim 1, wherein the cord or the wire is made of a low-stretch material of low-stretch steel wire, paraleine cord, or paraleine wire.

10. A measuring device according to claim 1, wherein the first and second sensors are arranged as pulse generators, and wherein a number of pulses delivered during use is proportional to a change in length and angular displacement of the cord or the wire, respectively.

11. A measuring device according to claim 1, further comprising a processing device connected to the sensors configured to process measuring signals delivered by the sensors into position data of the measuring probe and to make said data available on an interface.

12. A measuring device according to claim 11, further comprising a processing device, connected to the interface, provided with software configured to process the position data to drive a device for graphically representing the obtained position data.

13. A measuring device according to claim 11, further comprising a processing device, connected to the interface, provided with software configured to process the position data to drive a machining apparatus to produce an object corresponding to the position data.

14. A device for graphically representing measured position data, comprising:

a measuring device having a movable measuring probe; and first and second sensors, coupled to the measuring probe, configured to provide position data of the measuring probe, wherein the measuring probe is coupled, by a cord or a wire, to the first sensor to measure a length or change in length of the cord or the wire, and to the second sensor to measure an angle or angular displacement of the cord or the wire, which second sensor is coupled to an elongate, rotatably supported arm, in a longitudinal direction of which the cord or the wire engages the arm, wherein the arm is spatially rotatably supported at a first end by a sphere or ball type bearing, and the second sensor is configured to measure rotation of the arm in two degrees of freedom.

15. A machining apparatus for automatically producing objects based on predetermined measuring data, comprising:

a measuring device including a movable measuring probe and first and second sensors, coupled to the measuring probe, configured to provide position data of the measuring probe, wherein the measuring probe is coupled, by a cord or a wire, to the first sensor to measure a length or change in length of the cord or the wire, and to the second sensor to measure an angle or angular displacement of the cord or the wire, which second sensor is coupled to an elongate, rotatably supported arm, in a longitudinal direction of which the cord or the wire engages the arm, wherein the arm is spatially rotatably supported at a first end by a sphere or ball type bearing, and the second sensor is configured to measure rotation of the arm in two degrees of freedom.

16. A method for measuring an object by a measuring device comprising a movable measuring probe that is coupled, by a cord or wire, to first and second sensors configured to provide position data of the measuring probe by measuring a length or change in length of the core or the wire, and an angle or angular displacement of the cord or the wire, wherein the measuring probe is positioned on a circumference of the object to be measured, wherein an angle or angular displacement of the cord or the wire is measured in two degrees of freedom from an elongated arm spatially rotatable supported at a first end by a sphere or ball type bearing, in a longitudinal direction of which the cord or the wire engages the arm.

17. A method according to claim 16, wherein the measuring probe is moved along the circumference of the object to be measured, and measuring data is periodically obtained during movement of the measuring probe.

18. A method according to claim 16, wherein the measuring probe is positioned at a reference point prior to measuring an object for calibrating the measurement.

19. A method according to claim 16, wherein the measuring data obtained by moving a measuring probe is subjected to correction operations, including radius correction of the reel on which the core or the wire is wound, compensation of vibrations in the measuring arm coupled to the cord or the wire, measuring point and line filtered and offset correction in relation to dimensions of a measuring pin or measuring top of a measuring probe.

20. A method according to claim 19, wherein the measuring data is processed into an orthogonal coordinate system.

* * * * *